United States Patent
Rengaswamy et al.

(10) Patent No.: US 7,828,887 B2
(45) Date of Patent: Nov. 9, 2010

(54) DYE-BASED INK FORMULATIONS

(75) Inventors: Sukanya Rengaswamy, Corvallis, OR (US); Zia Ur Rehman, Corvallis, OR (US); Mary E Austin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 792 days.

(21) Appl. No.: 11/788,904

(22) Filed: Apr. 23, 2007

(65) Prior Publication Data

US 2008/0257207 A1  Oct. 23, 2008

(51) Int. Cl.
*C09D 11/00* (2006.01)
*C09D 11/02* (2006.01)

(52) U.S. Cl. .............. 106/31.58; 106/31.43; 106/31.47; 106/31.49; 106/31.5; 106/31.52

(58) Field of Classification Search .............. 106/31.58, 106/31.43, 31.47, 31.49, 31.5, 31.52
See application file for complete search history.

(56) References Cited

U.S. PATENT DOCUMENTS

| | | | | |
|---|---|---|---|---|
| 5,221,333 A | * | 6/1993 | Shirota et al. ............ | 106/31.58 |
| 5,300,143 A | * | 4/1994 | Schwarz, Jr. ............. | 106/31.43 |
| 5,788,754 A | * | 8/1998 | Deardurff et al. ......... | 106/31.58 |
| 5,925,176 A | * | 7/1999 | Rehman .................. | 106/31.43 |
| 6,027,210 A | * | 2/2000 | Kurabayashi et al. ....... | 347/100 |
| 6,722,765 B2 | | 4/2004 | Rolly | |
| 6,814,789 B2 | * | 11/2004 | Uhlir-Tsang et al. ..... | 106/31.58 |
| 7,264,662 B2 | * | 9/2007 | Dodge et al. ............... | 106/31.5 |
| 7,332,023 B2 | * | 2/2008 | Rehman et al. .......... | 106/31.58 |
| 7,638,609 B2 | * | 12/2009 | Mistry et al. ................ | 534/551 |
| 2002/0078858 A1 | | 6/2002 | Chen | |
| 2006/0187284 A1 | * | 8/2006 | Rehman et al. .......... | 106/31.58 |
| 2006/0196390 A1 | * | 9/2006 | Rehman et al. .......... | 106/31.58 |
| 2007/0062409 A1 | * | 3/2007 | Mistry et al. ................ | 106/31.5 |
| 2008/0107819 A1 | * | 5/2008 | Parazak et al. ............. | 106/31.5 |
| 2008/0257206 A1 | * | 10/2008 | Rengaswamy et al. ... | 106/31.43 |
| 2008/0266334 A1 | * | 10/2008 | Rehman et al. ................. | 347/1 |
| 2009/0136720 A1 | * | 5/2009 | Matsui et al. ............ | 428/195.1 |

FOREIGN PATENT DOCUMENTS

WO  2007/032377 A1  3/2007
WO  2007/132151 A1  1/2009

OTHER PUBLICATIONS

International Search Report for international application No. PCT/US2008/061187, filing date Apr. 22, 2008.

* cited by examiner

*Primary Examiner*—Helene Klemanski

(57) ABSTRACT

Dye-based ink formulations and methods of making dye-based ink formulations are disclosed.

22 Claims, No Drawings

DYE-BASED INK FORMULATIONS

BACKGROUND

The use of inkjet printing systems in offices and homes has grown dramatically in recent years. The growth can be attributed to drastic reductions in cost of inkjet printers and substantial improvements in print resolution and overall print quality. While the print quality has drastically improved, research and development efforts continue toward improving the durability and permanence of inkjet images particularly on porous media because this property still falls short of the durability and permanence produced by other printing and photographic techniques. A continued demand in inkjet printing has resulted in the need to produce images of high quality, high permanence, and high durability, while maintaining a reasonable cost. In particular, there is a demand for inkjet printing that can produce documents and photographs that can be resistant to damage by water and be kept for long periods of time without fading due to ozone and/or light.

SUMMARY

Briefly described, embodiments of this disclosure include dye-based ink formulations and methods of making dye-based ink formulations. One exemplary dye-based ink formulations, among others, includes a dye and a solvent, wherein the solvent is selected from: 1,2,4-butanetriol; 1,3-butylene glycol; N-(2-hydroxyethyl)propanamide; 1,2-butyleneglycol; 2,3-butanediol; 3-methyl-1,5-pentanediol; 1,6-hexanediol; 2-methyl-2,4-pentandiol; urea; hexylene glycol; betaine sulfolane; 1,2-hydroxyethyl-2-pyrrolidinone; sulfolane; 1,5-pentanediol; 2-pyridylcarbinol; 1,4-piperazinedicarboxaldehyde; N,N-dimethylpropionamide; 1,4-butanediol; dipropylene glycol; N-actyl-L-cysteine; and combinations thereof, and wherein the solvent is in an amount from about 5 to 30 weight percent of the dye-based ink formulation.

Another exemplary methods of making dye-based ink formulations, among others, includes: providing at least one dye from each of the following: a black dye, a yellow dye, a magenta dye, and a cyan dye; providing at least one solvent selected from: 1,2,4-butanetriol; 1,3-butylene glycol; N-(2-hydroxyethyl)propanamide; 1,2-butyleneglycol; 2,3-butanediol; 3-methyl-1,5-pentanediol; 1,6-hexanediol; 2-methyl-2,4-pentandiol; urea; hexylene glycol; betaine sulfolane; 1,2-hydroxyethyl-2-pyrrolidinone; sulfolane; 1,5-pentanediol; 2-pyridylcarbinol; 1,4-piperazinedicarboxaldehyde; N,N-dimethylpropionamide; 1,4-butanediol; dipropylene glycol; N-actyl-L-cysteine; and combinations thereof, and wherein the solvent is in an amount from about 5 to 30 weight percent of the dye-based ink formulation; and forming the dye-based ink formulation.

DETAILED DESCRIPTION

Embodiments of the present disclosure will employ, unless otherwise indicated, techniques of synthetic organic chemistry, ink chemistry, media chemistry, and the like, that are within the skill of the art. Such techniques are explained fully in the literature.

The following examples are put forth so as to provide those of ordinary skill in the art with a complete disclosure and description of how to perform the methods and use the compositions disclosed and claimed herein. Efforts have been made to ensure accuracy with respect to numbers (e.g., amounts, temperature, etc.) but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an" and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Light fastness is defined based on nominal light exposure behind glass before a failure condition (loss in optical density and/or change in hue) is reached. Nominal light exposure is 450 lux per 12 h day. The failure conditions used is 25% dye loss for the black, starting with a black only optical density of 0.6 and 4-ink (CMYK) optical density of 1.5 and or change in hue with time. The light fade is scored on a scale of 1 to 4 where a score of 1 would mean 0-25 yrs of light fade, a score of 2 would mean 26-50 yrs of light fade, a score of 3 would mean 51-75 yrs of light fade and a score of 4 would mean >75 yrs of light fade.

Ozone fade testing is carried out in a Hampton 903 ozone chamber at a temperature of 25° C., 50% relative humidity and with an ozone concentration of 1 ppm until a failure condition (loss in optical density and/or change in hue) is reached. The failure conditions used is 25% dye loss for the black, starting with a black only optical density of 0.6 and 4-ink (CMYK) optical density of 1.5 and/or change in hue with time. The ozone fade is scored on a scale of 1 to 4 where a score of 1 would mean 0-2 yrs of ozone fade, a score of 2 would mean 3-5 yrs of ozone fade, a score of 3 would mean 6-8 yrs of ozone fade and a score of 4 would mean >9 yrs of ozone fade.

Water resistance is determined using the ISO water resistance testing method ISO/DIS 18935:2004 (E). The water-fastness was scored on a scale of 0-6 where a score of 2 or lower would mean poor water resistance, a score of 3-4 would mean fairly water resistant and a score of 5-6 would indicate good water resistance.

Discussion

Dye-based ink formulations are described. The dye-based ink formulation includes select solvents that can be used with one dye or a combination of dyes (e.g., a black dye, a yellow dye, a magenta dye, a cyan dye, and combinations thereof). Use of the dye-based ink formulation can produce improved water-durability of the dye-based ink formulation on print media, while not affecting the reliability of the products. For example, porous media printed with the dye-based ink formulation have improved water-durability while retaining permanence when compared to other dye-based ink formulations printed onto the same type of porous media.

The dye-based ink formulation can be printed using an ink dispensing system that includes, but is not limited to, ink-jet technologies and coating technologies, which dispense the ink onto the print medium. Ink-jet technology, such as drop-on-demand and continuous flow ink-jet technologies, can be used to dispense the ink. The ink dispensing system can include at least one ink-jet printhead system (e.g., thermal ink-jet printhead and/or a piezo ink-jet print head) operative to dispense (e.g., jet) the inks through one or more of a plurality of nozzles in a printhead. The printhead system incorporates an array of firing chambers that receive the ink dissolved or dispersed in a liquid vehicle, which are in fluid communication with one or more ink reservoirs.

The term "print media" or "print medium" can include, but is not limited to, a paper substrate, a photobase substrate, greeting cards, film, coated paper, transparencies, brochure paper, fabric, and the like. In particular, the print media includes porous print media. Porous print media includes, but is not limited to, HP Advanced Photo Paper, Glossy, other photo media, HP Premium High Gloss Film, HP Photo Quality Inkjet Paper, other inkjet paper, HP Everyday Photo Paper, Semi-Gloss, HP Photo Paper and HP Brochure Tri-Fold, Gloss.

The dye-based ink formulation can include, but is not limited to, a dye and a vehicle. The dye-based ink formulation can include a single dye or a combination (blend) of dyes. In an embodiment, the dye-based ink formulation includes, but is not limited to, a black dye, a yellow dye, a magenta dye, a cyan dye, and any combination thereof.

The vehicle can include, but is not limited to, a solvent and optionally a surfactant and a buffer. In addition, the dye formulation includes, but is not limited to, salts, biocides, an aqueous solution, and combinations thereof.

The solvent can include, but is not limited to, 1,2,4-butanetriol; 1,3-butylene glycol; N-(2-hydroxyethyl)propanamide; 1,2-butyleneglycol; 2,3-butanediol; 3-methyl-1,5-pentanediol; 1,6-hexanediol; 2-methyl-2,4-pentandiol; urea; hexylene glycol; betaine sulfolane; 1,2-hydroxyethyl-2-pyrrolidinone; sulfolane; 1,5-pentanediol; 2-pyridylcarbinol; 1,4-piperazinedicarboxaldehyde; N,N-dimethylpropionamide; 1,4-butanediol; dipropylene glycol; N-actyl-L-cysteine; 2-ethyl-2-hydroxymethyl-1,3-propanediol (EHPD); 2-pyrrolidinone; and combinations thereof. In particular, the solvent can include 1,2,4-butanetriol; 1,3-butylene glycol; N-(2-hydroxyethyl)propanamide; 1,2-butyleneglycol; 2,3-butanediol; 3-methyl-1,5-pentanediol; 1,6-hexanediol; 2-methyl-2,4-pentandiol; urea; hexylene glycol; betaine sulfolane; 1,2-hydroxyethyl-2-pyrrolidinone; sulfolane; 2-ethyl-2-hydroxymethyl-1,3-propanediol (EHPD); 2-pyrrolidinone; and combinations thereof.

The solvent can be about 5 to 30 weight %, about 10 to 25 weight %, about 15 to 25 weight %, about 18 to 22 weight % of the dye-based ink formulation.

Various buffers or pH adjusting agents can also be optionally used in the ink formulation. The buffering agent can include, but are not limited to, hydroxides of alkali metals and amines (e.g., lithium hydroxide, sodium hydroxide, potassium hydroxide, and citric acid); amines (e.g., triethanolamine, diethanolamine, and dimethylethanolamine); hydrochloric acid; and other basic or acidic components which do not substantially interfere with the bleed control or optical density characteristics. In addition, commercially available pH buffers can also be used and are available from Sigma Aldrich (e.g., MES, MOPs, Trizma, Bis-Tris, MOPSO, TES, TAPSO, TEA, TRICINE, BICINE, TAPS, and AMPSO, in the acid or salt form).

The buffers can be about 0 to 1 weight % of the dye-based ink formulation.

Various surfactants can be used in the ink formulation. The surfactant can include, but are not limited to, anionic, non-ionic, and zwitterionic surfactants. The anionic surfactant can include, but is not limited to, sodium or potassium salts of straight chain fatty acids; sodium and potassium salts of coconut oil fatty acids; sodium and potassium salts of tall oil fatty acids; amine salts; acylated polypeptides; linear alkyl benzene sulfonates; higher alkyl benzene sulfonates; benzene; toulene; xylene; cumenesulfonate; lignosulfonates; petroleum sulfonates; N-acyl-n-alkyltaurates; paraffin sulfonates; secondary n-alkanesulfonates; alpha olefin sulfonates; sulfosuccnic esters; alkyl naphalene sulfonates; isethionates; sulfuric acid ester salts; sulfated polyoxyethylenated straight-chain alcohols; sulfated triglycerides oils; phosphoric and polyphosphoric acid esters; and perfluorinated anionic surfactants.

The non-ionic surfactant can include, but is not limited to, alkylphenol ethoxylates, polyoxyethylenates, straight chain alcohols ethoxylates, polyoxyethylenated polyoxypropylene glycols, polyoxyethylenated mercaptans, long chain carboxylic acid esters, glyceryl and polyglyceryl esters of natural and fatty acids, propylene glycol, sorbitol and polyoxyethylenated sorbitol esters, polyoxyethylene glycol esters and polyoxyethylenated fatty acids, aklanolamine condensates, alkanolamides, tertiary acetylenic glycols, polyoxyethylenated silicones, N-alkylprrrolidones, and alkylpolyglycosides.

The zwitterionic surfactant can include, but is not limited to, beta-N-alkylaminopropionic acids, N-alkyl-beta-iminodipropionic acids, imidazoline carboxylates, N-alkylbetaines, amine oxides, sulfobetaines and sultaines surfactants.

The surfactant can be about 0 to 3 weight % of the dye-based ink formulation.

The salt can include, but is not limited to, ammonium, potassium, or lithium benzoate salts; ammonium, potassium, or lithium acetates; lithium, potassium, or lithium xylene sulfonate salts; nitrates of $NH_4$, sodium, lithium, and potassium; lactates of ammonium, potassium, or lithium; citrates of ammonium, potassium, or lithium; carbonates of sodium, lithium, and potassium; diphosphates of sodium, lithium, and potassium; triphosphates of sodium, lithium, and potassium; and mixtures thereof. In addition, the salt can include sodium, lithium, and potassium salts of compounds such as, but not limited to, citrate, succinate, lactate, formate, gluconate, tartarate, malonate, fumarate, malate, sebacate, laurate, glutarate, acetate, oxylate, adipicate, pimelicate, subericate, azelaicate, and mixtures thereof.

The salt can be about 0 to 6 weight % of the dye-based ink formulation.

Various biocides can be used to inhibit growth of undesirable microorganisms. The biocides can include, but are not limited to, benzoate salts, sorbate salts, commercial products such as NUOSEPT™ (Nudex, Inc., a division of Huls America), UCARCIDE™ (Union Carbide), VANCIDE (RT Vanderbilt Co.), and PROXEL™ (ICI Americas), and other biocides.

The biocides can be about 0 to 3 weight % of the dye-based ink formulation.

The dyes may be nonionic, cationic, anionic, or mixtures thereof. The dyes for use in ink-jet printing may be employed in the practice of this disclosure. The dyes can include a large number of water-soluble acid and direct dyes. For the purposes of clarification only, and not for limitation, some exemplary colorants suitable for this purpose are set forth below.

Specific examples of such dyes include the Pro-Jet series of dyes available from Avecia Ltd., including Direct Yellow 86, Acid Red 249, Direct Blue 199, Direct Black 168, and Direct Yellow 132; Aminyl Brilliant Red F-B (Sumitomo Chemical Co.); the Duasyn line of "salt-free" dyes available from Hoechst, such as Reactive Black 31, Direct Yellow 157, Reactive Yellow 37, Acid Yellow 23, Reactive Red 180, Acid Red 52, and Acid Blue 9; mixtures thereof; and the like.

Further examples include Tricon Tricon Direct Red 227, and Tricon Acid Yellow 17 (Tricon Colors Incorporated), Bernacid Red 2BMN, Pontamine Brilliant Bond Blue A, BASF X-34, Pontamine, Food Black 2, Catodirect Turquoise FBL Supra Conc. (Carolina Color and Chemical), Direct Blue 86, (Mobay Chemical), Reactive Red 4, Aldrich Chemical), Reactive Red 56, Pylam, Inc., Levafix Brilliant Red E4B (Mobay Chemical), Levafix Brilliant Red E-6BA (Mobay Chemical), Pylam Certified D&C Red #28 (Pylam), Direct Brill Pink B Ground Crude (Crompton & Knowles), Cartasol Yellow GTF Presscake (Sandoz, Inc.), Tartrazine Extra Conc. (Sandoz, Inc.), Carolina Color and Chemical, Cartasol Yellow GTF Liquid Special 110 (Sandoz, Inc.), D&C Yellow #10 (Tricon), Yellow Shade 16948 (Tricon), Basacid Black X34 (BASF), Carta Black 2GT (Sandoz, Inc.), Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Aizen Spilon Yellow C-GNH (Hodagaya Chemical Company), Spirit Fast Yellow 3G, Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI Americas), Morfast Black Conc A (Morton-Thiokol), Diazol Black RN Quad (ICI Americas), Orasol Blue GN (Ciba-Geigy), Savinyl Blue GLS (Sandoz, Inc.), Luxol Blue MBSN (Morton-Thiokol), Sevron Blue 5GMF (ICI Americas), and Basacid Blue 750 (BASF); Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, all available from Bayer; Procion Turquoise PA, Procion Turquoise HA, Procion Turquoise Ho5G, Procion Turquoise H-7G, Procion Red MX-5B, Procion Red H8B, Procion Red MX 8B GNS, Procion Red G, Procion Yellow MX-8G, Procion Black H-EXL, Procion Black P-N, Procion Blue MX-R, Procion Blue MX4GD, Procion Blue MX-G, and Procion Blue MX-2GN, all available from ICI Americas; Cibacron Red F-B, Cibacron Black BG, Lanasol Black B, Lanasol Red 5B, Lanasol Red B, and Lanasol Yellow 46, all available from Ciba-Geigy; Baslien Black P-BR, Baslien Yellow EG, Baslien Brilliant Yellow P-3GN, Baslien Yellow M-6GD, Baslien Brilliant Red P-3B, Baslien Scarlet E-2G, Baslien Red E-B, Baslien Red E-7B, Baslien Red M-5B, Baslien Blue E-R, Baslien Brilliant Blue P-3R, Baslien Black P-BR, Baslien Turquoise Blue P-GR Baslien Turquoise M-2G, Baslien Turquoise E-G, and Baslien Green E-6B, all available from BASF; Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, all available from Sumitomo Chemical Company; Intracron Yellow C-8G, Intracron Red C-8B, Intracron Turquoise Blue GE, Intracron Turquoise HA, and Intracron Black RL, all available from Crompton and Knowles, Dyes and Chemicals Division; mixtures thereof, and the like. This list is intended to be merely exemplary, and should not be considered limiting.

The dye-based black ink formulation includes, but is not limited to, a black dye, a yellow dye, a magenta dye, and a cyan dye. In addition, the dye-based black ink formulation includes, but is not limited to, solvents, salts, buffers, biocides, binders, an aqueous solution, and combinations thereof.

The black dye can include, but is not limited to, 1H-Pyrazole-3-carboxylic acid, 4-[[6-[[4-[(1,5-disulfo-2-naphthalenyl)azo]-2-methoxy-5-methylphenyl]azo]-5-hydroxy-7-sulfo-2-naphthalenyl]azo]-4,5-dihydro-5-oxo-1-(4-sulfophenyl)-, lithium sodium salt (Experimental Black 16), 2,7-Naphthalenedisulfonic acid, 3-[[4-[[4-[[5-(aminocarbonyl)-1-ethyl-1,6-dihydro-2-hydroxy-4-methyl-6-oxo-3-pyridinyl]azo]-2-sulfophenyl]azo]-2,5-bis(2-hydroxyethoxy) phenyl]azo]-4,5-dihydroxy-, potassium sodium salt (Experimental Black 10), Cuprate(4-), [2-(amino-KN)ethanol][7-[[3-(hydroxy-κO)-4-[[1-(hydroxy-κO)-3-sulfo-7-[(2-sulfoethyl)amino]-2-naphthalenyl]azo-κN1]phenyl]azo]-1, 3-naphthalenedisulfonato(6-)]-, tetrasodium (9Cl) (Experimental black 11), 2,7-Naphthalenedisulfonic acid, 6-amino-4-hydroxy-3-[[7-sulfo-4-[(4-sulfophenyl)azo]-1-naphthalenyl]azo]-, tetrasodium salt (7Cl) (Food Black 2),1, 3-Benzenedicarboxylic acid, 5-[[4-[(7-amino-1-hydroxy-3-sulfo-2-naphthalenyl)azo]-6-sulfo-1-naphthalenyl]azo]-, tetraammonium salt (9Cl) (Project 286), and combinations thereof.

In addition, it should be noted that the black dye can include, but is not limited to, trisazo-dyes. In particular, the black dye can include compounds defined by formula 1 below:

Formula (1)

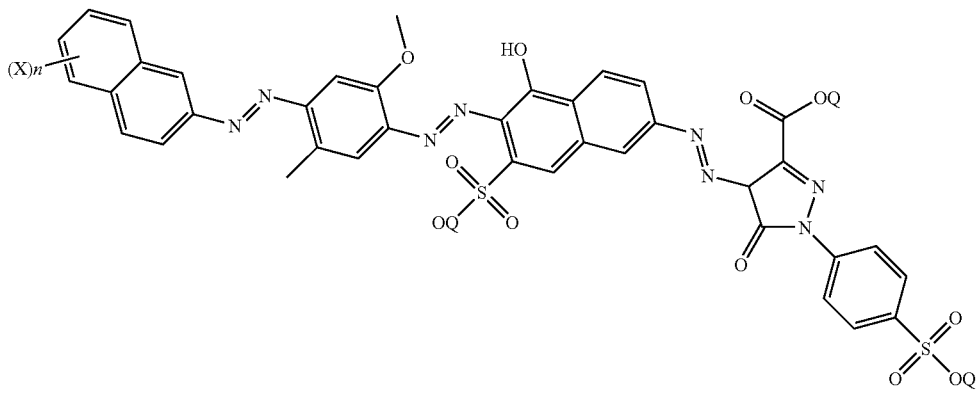

wherein X is SO₃Q, where Q is a sodium ion, lithium ion, or a combination thereof, and where n is 1, 2 or 3. Additional embodiments of trisazo-dyes are described in U.S. Patent Application 20070062409, which is incorporated herein by reference.

In addition, it should be noted that the black dye can include, but is not limited to, an azo-compounds. In particular, the azo-compound has the chemical structure of Formula 2:

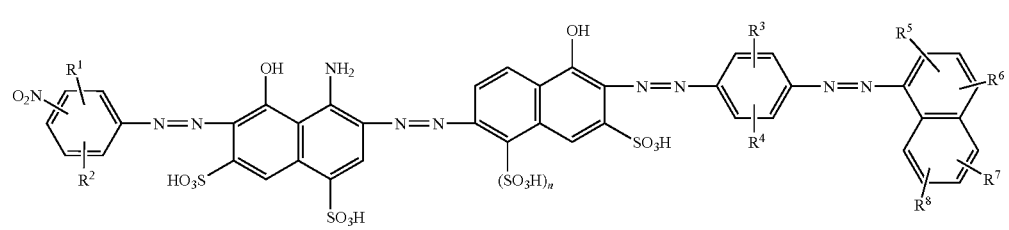

Formula (2)

wherein $R^1$ and $R^2$ each independently represents a hydrogen, a halogen, a cyano group, a carboxy group, a sulfo group, a sulfamoyl group, a N-alkylaminosulfonyl group, and a N-phenylaminosulfonyl group; $R^3$, $R^4$, $R^5$, $R^6$, $R^7$, and $R^8$ each independently represents a hydrogen, a halogen group, a hydroxy group, a cyano group, a carboxy group, a sulfo group, a sulfamoyl group, a N-alkylaminosulfonyl group, a N-phenylaminosulfonyl group; and n is 0 or 1.

The black dye can be about 0.5 to 5.0 weight % of the dye-based black ink formulation.

The yellow dye can include, but is not limited to, 1,5-Naphthalenedisulfonic acid, 3-[[4-[[4,6-bis[(3-sulfopropyl) thio]-1,3,5-triazin-2-yl]amino]-5-methoxy-2-methylphenyl] azo]-, tetrasodium salt (9Cl) (Y104), 1,3-Naphthalenedisulfonic acid, 7-[[4-[[4,6-bis[(3-sulfopropyl) thio]-1,3,5-triazin-2-yl]amino]-3-methoxyphenyl]azo]-, tetrasodium salt (9Cl) (Y1189), Benzenesulfonic acid, 2,5-dichloro-4-[4,5-dihydro-3-methyl-5-oxo-4-[(4-sulfophenyl) azo]-1H-pyrazol-1-yl]-, disodium salt (9Cl) (Acid Yellow 17-Na), 1H-Pyrazole-3-carboxylic acid, 4,5-dihydro-5-oxo-1-(4-sulfophenyl)-4-[(4-sulfophenyl)azo], trisodium salt (9Cl) (Acid Yellow 23), 1,5-Naphthalenedisulfonic acid, 3,3'-[[6-[(2-hydroxyethyl)amino]-1,3,5-triazine-2,4-diyl]bis [imino(2-methyl-4,1-phenylene)-2,1-diazenediyl]]bis-, sodium salt (1:4) or TMA salt (Direct Yellow 86), and combinations thereof. The yellow dye can be about 0.1 to 4.0 weight % of the dye-based black ink formulation.

The magenta dye can include, but is not limited to, 6-Benzothiazolesulfonic acid, 2-[4-cyano-3-(1,1-dimethylethyl)-5-[[4-methyl-6-[(6-sulfo-2 benzothiazolyl)(2,4,6-trimethyl-3-sulfophenyl)amino]-2-[(2,4,6-trimethyl-3-sulfophenyl) amino]-3-pyridinyl]azo]-1H-pyrazol-1-yl] (Experimental Magenta 1), 1,3-Benzenedisulfonic acid, 4-[[2,7-dihydro-3-methyl-2,7-dioxo-1-(3-sulfobenzoyl)-3H-naphtho[1,2,3-de] quinolin-6-yl]amino]-, ammonium salt (1:3) (Experimental Magenta 2), 2,7-Naphthalenedisulfonic acid, 5-(benzoylamino)-4-hydroxy-3-[[1-sulfo-6-[[2-(sulfooxy)ethyl]sulfonyl]-2-naphthalenyl]azo]-, tetrasodium salt (9Cl) (Reactive Red 180-Na), Xanthylium, 3-[(2,6-dimethylphenyl)amino]-6-[(2,6-dimethylsulfophenyl)amino]-9-(2-sulfophenyl)-, inner salt, monosodium salt (9Cl) (Acid Red 289-Na), Xanthylium, 3,6-bis(diethylamino)-9-(2,4-disulfophenyl)-, inner salt, sodium salt (9Cl) (Acid Red 52), 2-Naphthalenesulfonic acid, 6-amino-5-[[4-[[4-[bis(2-hydroxyethyl)amino]-6-[(2-sulfoethyl)amino]-1,3,5-triazin-2-yl]amino]phenyl]azo]-4-hydroxy-, disodium salt (9Cl) (M-377-Na), Nickel, 5-[(2-hydroxy-3,7-disulfo-1-naphthalenyl)azo]-1H-1,2,4-triazole-3-carboxylate sodium complexes (Experimental Magenta 7), and combinations thereof. The magenta dye can be about 0. to 3.5 weight % of the dye-based black ink formulation.

The cyan dye can include, but is not limited to, Cuprate(3-), [[3,3',3''-[[23-[[3-[[(2-hydroxypropyl)amino]sulfonyl]propyl]sulfonyl]-29H,31H-phthalocyanine-2,9,16-triyl-κN29, κN30, κN31, κN32]tris(sulfonyl)]tris[1-propanesulfonato]] (5-)]-, trilithium, (SP-4-2)-(9Cl) (Experimental Cyan 1), Copper, [29H, 31H-phthalocyaninato (2-)-kN29, kN30, kN31, kN32]-, aminosulfonyl [(2-hydroxyethyl)amino]sulfonyl sulfo derivs., ammonium sodium salts (Experimental Cyan 171), Copper,[29H,31H-phthalocyaninato(2-)-xN29, xN30,xN31,xN32]-,aminosulfonyl[(2-hydroxyethyl)amino] sulfonyl sulfo derivs, sodium salts (Cyan 485).

The cyan dye can be about 0 to 4.0 weight % of the dye-based black ink formulation.

EXAMPLES

Now having described the embodiments of the present disclosure, in general, the following Examples describe some additional embodiments of the present disclosure. While embodiments of present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Example 1

Table 1 shows examples of designed experiments where inks were made in ink vehicles containing 10.0 weight % of a single solvent (as noted by sample # in (#)) in addition to a buffer, a surfactant and a biocide. Each ink had a constant colorant loading thus the observed differences in water resistance can be attributed to the effect of the solvent alone. As shown in Table 1 some of the solvents helped improve water resistance of the images.

TABLE 1

| Component | Weight % | Water fastness |
|---|---|---|
| Tergitol 15-S-7 | 0.2 | |
| MES sodium | 0.2 | |

TABLE 1-continued

| Component | Weight % | Water fastness |
|---|---|---|
| EDTA Na2 | 0.1 | |
| Proxel GXL | 0.1 | |
| Samples (#) | | |
| 1,2,4-butanetriol | 10(1) | 5 |
| 1,3-butylene glycol | 10(2) | 5 |
| 1,5-pentanediol | 10(3) | 3 |
| glycerol | 10(4) | 1 |
| 2-pyridylcarbinol | 10(5) | 3 |
| 3-methyl-1,3,5-pentanetriol | 10(6) | 1 |
| N-(2-hydroxyethyl)propanamide | 10(7) | 5 |
| 1,2-butyleneglycol | 10(8) | 5 |
| N-(2-hydroxyethyl)acetamide | 10(9) | 1 |
| 4-pyridinepropanol | 10(10) | 1 |
| 3-morpholino-1,2-propanediol | 10(11) | 1 |
| Piperazine | 10(12) | 1 |
| 1,4-piperazinedicarboxaldehyde | 10(13) | 3 |
| N,N-dimethylpropionamide | 10(14) | 3 |
| 2,3-butanediol | 10(15) | 5 |
| 3-methy-1,5-pentanediol | 10(16) | 5 |
| 1,4-butanediol | 10(17) | 3 |
| 2-pyridylcarbinol | 10(18) | 3 |
| 1-methylpyrazole | 10(19) | 1 |
| 1,2,3-trihydroxyhexane | 10(20) | 1 |
| Dipropylene glycol | 10(21) | 3 |
| N-actyl-L-cysteine | 10(22) | 3 |
| 1-ethyl-2P-4-carboxamide | 10(23) | 1 |
| 1-methyl-2P-4-carboxamide | 10(24) | 1 |
| 1,6-Hexanediol | 10(25) | 5 |
| Butyramide | 10(26) | 1 |
| N-(2-hydroxy-1-proxyl) acetamide | 10(27) | 1 |
| Urea | 10(28) | 5 |
| Hexylene Glycol | 10(29) | 5 |
| Sulfolane | 10(30) | 5 |
| 1,2-Hydroxyethyl-2P | 10(31) | 5 |
| Betaine Sulfolane | 10(32) | 5 |

Example 2

Table 2a provides an illustrative embodiment of an ink formulation of the present disclosure. The black inks are made with 4.0 weight % Formula (2) dye and 3.0 weight % Experimental Black 16 in a vehicle containing 10.9% EHPD had good color neutrality but, did not exhibit good water resistance in the ISO waterfastness test (Table 2b).

TABLE 2a

| Component | CAS# | Ink 1 wt % | Ink 2 wt % |
|---|---|---|---|
| 1,2-Hydroxyethyl 2P | | | |
| EHDP | 77-99-6 | 10.9 | 10.9 |
| 2-Pyrrolidone | 616-45-5 | 6.5 | 6.5 |
| 1,5 Pentanediol | 111-29-5 | 2 | 2 |
| Tergitol 15-S-7 | 68131-40-8 | 0.2 | 0.2 |
| MES sodium | 71119-23-8 | 0.2 | 0.2 |
| DOWFAX8390 | | 0.04 | 0.04 |
| EDTA Na2 | 6381-92-6 | 0.0075 | 0.0075 |
| betaine | 107-43-7 | 3.6 | 3.6 |
| 2 methyl 2,4 Pentanediol | | | |
| Proxel GXL | | 0.1 | 0.1 |

| DYES | Weight % | Weight % |
|---|---|---|
| Formula (2) | 4 | |
| Experimental black 16 | | 3 |
| Balance H2O | | |

TABLE 2b

| | Properties of Ink 1 | Properties of Ink 2 |
|---|---|---|
| Color | Blue Black | Neutral Black |
| Ozone Fade | 3 | 2 |
| Light Fade | 4 | 4 |
| Water Fastness | 1 | 3 |
| L* min | >8 | <8 |
| Chroma | >8 | <8 |

Example 3

Table 3a provides an illustrative embodiment of an ink formulation of the present disclosure. Removing EHPD and betaine from the ink vehicle components and adding 7 weight % 1,2-hydroxyethyl-2P-greatly improved the water resistance of images printed with inks made with 4.0 weight % Formula (2) dye and 3.0 weight % Experimental Black 16 (Table 3b).

TABLE 3a

| Component | CAS# | Ink 3 wt % | Ink 4 wt % |
|---|---|---|---|
| 1,2 Hydroxyethyl 2P | | 7 | 7 |
| EHPD | 77-99-6 | — | — |
| 2-Pyrrolidone | 616-45-5 | 6.5 | 6.5 |
| 1,5 Pentanediol | 111-29-5 | 2 | 2 |
| Tergitol 15-S-7 | 68131-40-8 | 0.1 | 0.1 |
| MES sodium | 71119-23-8 | 0.2 | 0.2 |
| DOWFAX8390 | | 0.04 | 0.04 |
| EDTA Na2 | 6381-92-6 | 0.0075 | 0.0075 |
| | | 7 | 7 |
| | | 0.1 | 0.1 |

| DYES | Weight % | Weight % |
|---|---|---|
| Formula (2) | 4 | |
| Experimental dye 16 | | 3 |
| Balance H2O | | |

TABLE 3b

| | Properties of Ink 3 | Properties of Ink 4 |
|---|---|---|
| Color | Blue Black | Neutral Black |
| Ozone Fade | 3 | 2 |
| Light Fade | 4 | 4 |
| Water Fastness | 3 | 4 |
| L* min | >8 | <8 |
| Chroma | >8 | <8 |

Example 4

Table 4a provides an illustrative embodiment of an ink formulation of the present disclosure. The addition of 7.0 weight % 2-methyl-2,4-pentanediol in addition to 1,2-hydroxyethyl-2P-to the ink vehicle significantly improved the water resistance of the black inks in the ISO waterfastness test (Table 4b).

TABLE 4a

| Component | CAS# | Formulation 5 wt % | Formulation 6 wt % |
|---|---|---|---|
| 1,2 Hydroxyethyl 2P | | 7 | 7 |
| EHPD | 77-99-6 | — | — |

TABLE 4a-continued

| Component | CAS# | Formulation 5 wt % | Formulation 6 wt % |
|---|---|---|---|
| 2-Pyrrolidone | 616-45-5 | 6.5 | 6.5 |
| 1,5 Pentanediol | 111-29-5 | 2 | 2 |
| Tergitol 15-S-7 | 68131-40-8 | 0.1 | 0.1 |
| MES sodium | 71119-23-8 | 0.2 | 0.2 |
| DOWFAX8390 | | 0.04 | 0.04 |
| EDTA Na2 | 6381-92-6 | | |
| betaine | 107-43-7 | 3.6 | 3.6 |
| 2 methyl 2,4 Pentanediol | | 7 | 7 |
| Proxel GXL | | 0.1 | 0.1 |
| DYES | | | |
| Formula (2)dye | | 4 | |
| Ex. Black 16 | | | 3 |
| Balance H2O | | | |

TABLE 4b

| | Properties of Ink 5 | Properties of Ink 6 |
|---|---|---|
| Color | Blue Black | Neutral Black |
| Ozone Fade | 3 | 2 |
| Light Fade | 4 | 4 |
| Water Fastness | 4 | 5 |
| L* min | >8 | <8 |
| Chroma | >8 | <8 |

Example 5

Table 5a provides an illustrative embodiment of an ink formulation of the present disclosure. Inks made in an ink vehicle containing 7.0 weight % each of two solvents, 1,2-butylene glycol and 1,6-hexanediol resulted in printed images that had excellent water resistance in the ISO waterfastness test (Table 5b).

TABLE 5a

| Component | Ink 7 |
|---|---|
| 1,2-butylene glycol | 7 |
| 1,6 hexanediol | 7 |
| Tergitol 15-S-7 | 0.2 |
| MES sodium | 0.2 |
| EDTA Na2 | 0.1 |
| Proxel GXL | 0.1 |
| Dye | Weight % |
| Experimental cyan 1 | 1.59 |
| Experimental dye 16 | 1.71 |
| Experimental magenta 1 | 1.9 |
| Y104 | 2.96 |

TABLE 5b

| | Properties of Ink 7 |
|---|---|
| Color | Neutral Black |
| Ozone Fade | 4 |
| Light Fade | 4 |
| Water Fastness | 5 |
| L* min | <8 |
| Chroma | <8 |

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±6%, ±7%, ±8%, ±9%, or ±10%, or more of the numerical value(s) being modified. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

At least the following is claimed:

1. A dye-based ink formulation, comprising: a dye and a solvent, wherein the solvent is selected from the group consisting of: 1,2,4-butanetriol; 1,3-butylene glycol; N-(2-hydroxyethyl)propanamide; 1,2-butyleneglycol; 2,3-butanediol; 3-methyl-1,5-pentanediol; 1,6-hexanediol; 2-methyl-2,4-pentandiol; urea; betaine sulfolane; 1,2-hydroxyethyl-2-pyrrolidinone; sulfolane; 1,5-pentanediol; 2-pyridylcarbinol; 1,4-piperazinedicarboxaldehyde; N,N-1 dimethylpropionamide; 1,4-butanediol; dipropylene glycol; N-actyl-L-cysteine; and combinations thereof, wherein the solvent is in an amount from about 5 to 30 weight percent of the dye-based ink formulation; and wherein the ink includes a black dye selected from the group consisting of 1H-Pyrazole-3-carboxylic acid, 4-[[6-[[4-[(1,5-disulfo-2-naphthalenyl)azo]-2-methoxy-5-methylphenyl]azo]-5-hydroxy-7-sulfo-2-naphthalenyl]azo]-4,5-dihydro-5-oxo-1-(4-sulfophenyl)-, lithium sodium salt; 2,7-Naphthalenedisulfonic acid, 3-[[4-[[4-[[5-(aminocarbonyl)-1-ethyl-1,6-dihydro-2-hydroxy-4-methyl-6-oxo-3-pyridinyl]azo]-2-sulfophenyl]azo]-2,5-bis(2-hydroxyethoxy)phenyl]azo]-4,5-dihydroxy-, potassium sodium salt; Cuprate(4-), [2-(amino-κN)ethanol][7-[[3-(hydroxy-κO)-4-[[1-(hydroxyl κO)-3-sulfo-7-[(2-sulfoethyl)amino]-2-naphthalenyl]azo-κN1]phenyl]azo]-1,3-naphthalenedisulfonato(6-)]-, tetrasodium (9CI); 2,7-Naphthalenedisulfonic acid, 6-amino-4-hydroxy-3-[[7-sulfo-4-[(4-sulfophenyl)azo]-1-naphthalenyl]azo]-, tetrasodium salt (7CI); 1,3-Benzenedicarboxylic acid, 5-[[4-(7-amino-1-hydroxy-3-sulfo-2-naphthalenyl) azo]-6-sulfo-1-naphthalenyl]azo]-, tetraammonium salt (9CI); a black dye of formula 1:

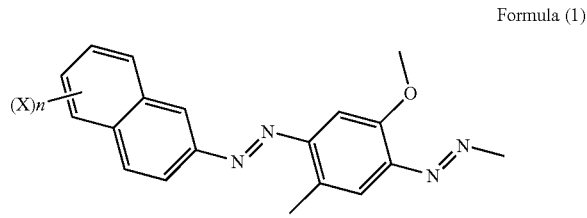

Formula (1)

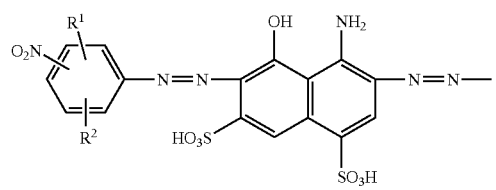

wherein X is $SO_3Q$, where Q is a sodium ion, lithium ion, or a combination thereof, and where n is 1, 2 or 3; a black dye of formula 2:

Formula (2)

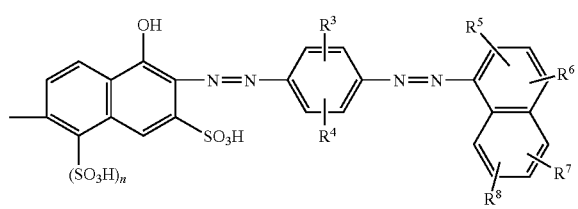

wherein $R^1$ and $R^2$ each independently represents a hydrogen, halogen a cyano group, a carboxy group, a sulfo group, a sulfamoyl group, a N-alkylaminosulfonyl group, and a N-phenylaminosulfonyl group; $R^3$, $R^4$, $R^5$, $R^6$, $R^7$, and $R^8$ each independently represents a hydrogen, a halogen group, a hydroxy group, a cyano group, a carboxy group, a sulfo group, a sulfamoyl group, a N-alkylaminosulfonyl group, a N-phenylaminosulfonyl group; and n is 0 or 1; and combinations thereof.

2. The dye-based ink formulation of claim 1, wherein the solvent is selected from the group consisting of: 1,2,4-butanetriol; 1,3-butylene glycol; N-(2-hydroxyethyl)propanamide; 1,2-butyleneglycol; 2,3-butanediol; 3-methyl-1,5-pentanediol; 1,6-hexanediol; 2-methyl-2,4-pentandiol; urea; betaine sulfolane; 1,2-hydroxyethyl-2-pyrrolidinone; sulfolane, and combinations thereof.

3. The dye-based ink formulation of claim 2, wherein the solvent is in an amount from about 10 to 25 weight percent of the dye-based ink formulation.

4. The dye-based ink formulation of claim 1, wherein the ink further includes one or more dyes selected from the group consisting of: a a yellow dye, a magenta dye, a cyan dye, and combinations thereof.

5. The dye-based ink formulation of claim 1, wherein the black dye includes compounds defined by formula 1 below:

Formula (1)

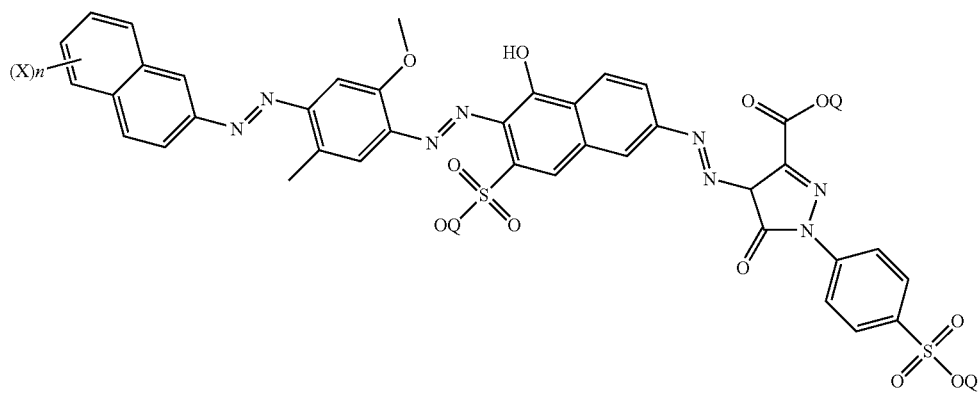

wherein X is $SO_3Q$, where Q is a sodium ion, lithium ion, or a combination thereof, and where n is 1, 2 or 3.

6. The dye-based ink formulation of claim 1, wherein the black dye includes compounds defined by formula 2 below:

Formula (2)

wherein R¹ and R² each independently represents a hydrogen, a halogen, a cyano group, a carboxy group, a sulfo group, a sulfamoyl group, a N-alkylaminosulfonyl group, and a N-phenylaminosulfonyl group; R³, R⁴, R⁵, R⁶, R⁷, and R⁸ each independently represents a hydrogen, a halogen group, a hydroxy group, a cyano group, a carboxy group, a sulfo group, a sulfamoyl group, a N-alkylaminosulfonyl group, a N-phenylaminosulfonyl group; and n is 0 or 1.

7. The dye-based ink formulation of claim 4, wherein the yellow dye is selected from the group consisting of: 1,5-Naphthalenedisulfonic acid, 3-[[4-[[4,6-bis[(3-sulfopropyl)thio]-1,3,5-triazin-2-yl]amino]-5-methoxy-2-methylphenyl]azo]-, tetrasodium salt (9Cl); 1,3-Naphthalenedisulfonic acid, 7-[[4-[[4,6-bis[(3-sulfopropyl)thio]-1,3,5-triazin-2-yl]amino]-3-methoxyphenyl]azo]-, tetrasodium salt (9Cl); Benzenesulfonic acid, 2,5-dichloro-4-[4,5-dihydro-3-methyl-5-oxo-4-[(4-sulfophenyl)azo]-1H-pyrazol-1-yl], disodium salt (9Cl); 1H-Pyrazole-3-carboxylic acid, 4,5-dihydro-5-oxo-1-(4-sulfophenyl)-4-[(4-sulfophenyl)azo], trisodium salt (9Cl); 1,5-Naphthalenedisulfonic acid, 3,3'-[[6-[(2-hydroxyethyl)amino]-1,3,5-triazine-2,4-diyl]bis[imino(2-methyl-4,1-phenylene)-2,1-diazenediyl]]bis-, sodium salt (1:4) or TMA salt; and combinations.

8. The dye-based ink formulation of claim 4, wherein the magenta dye is selected from the group consisting of: 6-Benzothiazolesulfonic acid, 2-[4-cyano-3-(1,1-dimethylethyl)-5-[[4-methyl-6-[(6-sulfo-2 benzothiazolyl) (2,4,6-trimethyl-3-sulfophenyl)amino]-2-[(2,4,6-trimethyl-3-sulfophenyl)amino]-3-pyridinyl]azo]-1H-pyrazol-1-yl]; 1,3-Benzenedisulfonic acid, 4-[[2,7-dihydro-3-methyl-2,7-dioxo-1-(3-sulfobenzoyl)-3H-naphtho[1,2,3-de]quinolin-6-yl]amino]-, ammonium salt (1:3); 2,7-Naphthalenedisulfonic acid, 5-(benzoylamino)-4-hydroxy-3-[[1-sulfo-6-[[2-(sulfooxy)ethyl]sulfonyl]-2-naphthalenyl]azo]-, tetrasodium salt (9Cl); Xanthylium, 3-[(2,6-dimethylphenyl)amino]-6-[(2,6-dimethylsulfophenyl)amino]-9-(2-sulfophenyl)-, inner salt, monosodium salt (9Cl; Xanthylium, 3,6-bis(diethylamino)-9-(2,4-disulfophenyl)-, inner salt, sodium salt (9Cl); 2-Naphthalenesulfonic acid, 6-amino-5-[[4-[[4-[bis(2-hydroxyethyl)amino]-6-[(2-sulfoethyl)amino]-1,3,5-triazin-2-yl]amino]phenyl]azo]-4-hydroxy-, disodium salt (9Cl); Nickel, 5-[(2-hydroxy-3,7-disulfo-1-naphthalenyl)azo]-1H-1,2,4-triazole-3-carboxylate sodium complexes; and combinations thereof.

9. The dye-based ink formulation of claim 4, wherein the cyan dye is selected from the group consisting of Cuprate(3-), [[3,3',3"-[[23-[[3-[[(2-hydroxypropyl)amino]sulfonyl]propyl]sulfonyl]-29H,31H-phthalocyanine-2,9,16-triyl-κN29, κN30, κN31, κN32]tris(sulfonyl)]tris[1-propanesulfonato]](5-)]-, trilithium, (SP-4-2)-(9Cl); Copper, [29H,31H-phthalocyaninato (2-)-kN29,kN30,kN31,kN32]-, aminosulfonyl [(2-hydroxyethyl)amino]sulfonyl sulfo derivatives, ammonium sodium salts; Copper, [29H,31H-phthalocyaninato(2-)-xN29,xN30,xN31,xN32]-,aminosulfonyl[(2-hydroxyethyl)amino]sulfonyl sulfo derivatives, sodium salts; and combinations thereof.

10. The dye-based ink formulation of claim 4, wherein the yellow dye is selected from the group consisting of: 1,5-Naphthalenedisulfonic acid, 3-[[4-[[4,6-bis[(3-sulfopropyl)thio]-1,3,5-triazin-2-yl]amino]-5-methoxy-2-methylphenyl]azo]-, tetrasodium salt (9Cl); 1,3-Naphthalenedisulfonic acid, 7-[[4-[[4,6-bis[(3-sulfopropyl)thio]-1,3,5-triazin-2-yl]amino]-3-methoxyphenyl]azo]-, tetrasodium salt (9Cl); Benzenesulfonic acid, 2,5-dichloro-4-[4,5-dihydro-3-methyl-5-oxo-4-[(4-sulfophenyl)azo]-1H-pyrazol-1-yl]-, disodium salt (9Cl); 1H-Pyrazole-3-carboxylic acid, 4,5-dihydro-5-oxo-1-(4-sulfophenyl)-4-[(4-sulfophenyl)azo], trisodium salt (9Cl); 1,5-Naphthalenedisulfonic acid, 3,3'-[[6-[(2-hydroxyethyl)amino]1,3,5-triazine-2,4-diyl]bis[imino(2-methyl-4,1-phenylene)-2,1-diazenediyl]]bis-, sodium salt (1:4) or TMA salt; and combinations thereof;

the magenta dye is selected from the group consisting of 6-Benzothiazolesulfonic acid, 2-[4-cyano-3-(1,1-dimethylethyl)-5-[[4-methyl-6-[(6-sulfo-2 benzothiazolyl) (2,4,6-trimethyl-3-sulfophenyl)amino]-2-[(2,4,6-trimethyl-3-sulfophenyl)amino]-3-pyridinyl]azo]-1H-pyrazol-1-yl]; 1,3-Benzenedisulfonic acid, 4-[[2,7-dihydro-3-methyl-2,7-dioxo-1-(3-sulfobenzoyl)-3H-naphtho[1,2,3-de]quinolin-6-yl]amino]-, ammonium salt (1:3); 2,7-Naphthalenedisulfonic acid, 5-(benzoylamino)-4-hydroxy-3-[[1-sulfo-6-[[2-(sulfooxy)ethyl]sulfonyl]-2-naphthalenyl]azo]-, tetrasodium salt (9Cl); Xanthylium, 3-[(2,6-dimethylphenyl)amino]-6-[(2,6-dimethylsulfophenyl)amino]-9-(2-sulfophenyl)-, inner salt, monosodium salt (9Cl); Xanthylium, 3,6-bis(diethylamino)-9-(2,4-disulfophenyl)-, inner salt, sodium salt (9Cl); 2-Naphthalenesulfonic acid, 6-amino-5-[[4-[[4-[bis(2-hydroxyethyl)amino]-6-[(2-sulfoethyl)amino]-1,3,-5-triazin-2-yl]amino]phenyl]azo]-4-hydroxy-, disodium salt (9Cl); Nickel, 5-[(2-hydroxy-3,7-disulfo-1-naphthalenyl)azo]-1H-1,2,4-triazole-3-carboxylate sodium complexes; and combinations thereof; and the cyan dye is selected from the group consisting of: Cuprate(3-), [[3,3',3"-[[23-[[3-[[(2-hydroxypropyl)amino]sulfonyl]propyl]sulfonyl]-29H,31H-phthalocyanine-2,9,16-triyl-κN29,κN30,κN31,κN32]tris(sulfonyl)]tris[1-propanesulfonato]](5-)]-, trilithium, (SP-4-2)-(9Cl); Copper, [29H,31H-phthalocyaninato (2-)-kN29,kN30,kN31,kN32]-, aminosulfonyl [(2-hydroxyethyl)amino]sulfonyl sulfo derivatives, ammonium sodium salts; Copper, [29H,31H-phthalocyaninato(2-)-xN29,xN30,xN31,xN32]-,aminosulfonyl[(2-hydroxyethyl)amino]sulfonyl sulfo derivatives, sodium salts; and combinations thereof.

11. A method of making a dye-based black ink formulation, comprising:

providing at least one dye from each of the following: a black dye, a yellow dye, a magenta dye, and a cyan dye;

providing at least one solvent selected from the group consisting of 1,2,4-butanetriol; 1,3-butylene glycol; N-(2-hydroxyethyl)propanamide; 1,2-butyleneglycol; 2,3-butanediol; 3-methyl, 1,5-pentanediol; 1,6-hexanediol; 2-methyl-2,4-pentandiol; urea; betaine sulfolane; 1,2 hydroxyethyl-2-pyrrolidinone; sulfolane; 1,5-pentanediol; 2-pyridylcarbinol; 1,4-piperazinedicarboxaldehyde; N,N-dimethylpropionamide; 1,4-butanediol; dipropylene glycol; N-actyl-L-cysteine; and combinations thereof, wherein the solvent is in an amount from about 5 to 30 weight percent of the dye-based ink formulation;

wherein the ink includes a black dye selected from the group consisting of 1H-Pyrazole-3-carboxylic acid, 4-[[6-[[4-[(1,5-disulfo-2-naphthalenyl)azo]-2-methoxy-5-methylphenyl]azo]-5-hydroxy-7-sulfo-2-naphthalenyl]azo]-4,5-dihydro-5-oxo-1-(4-sulfophenyl)-, lithium sodium salt; 2,7-Naphthalenedisulfonic acid, 3-[[4-[[4-[[5-(aminocarbonyl)-1-ethyl-1,6-dihydro-2-hydroxy-4-methyl-6-oxo-3-pyridinyl]azo]-2-sulfophenyl]azo]-2,5-bis(2-hydroxyethoxy)phenyl]azo]-4,5-dihydroxy-, potassium sodium salt; Cuprate(4-), [2-(amino-κN)ethanol][7-[[3-(hydroxy-κO)-4-[[1-(hydroxyl κO)-3-sulfo-7-[(2-sulfoethyl)amino]-2-naphthalenyl]azo-κN1]phenyl]azo]-1,3-naphthalenedisulfonato(6-)]-, tetrasodium (9Cl); 2,7-Naphthalenedisulfonic acid, 6-amino-4-hydroxy-3-[[7-sulfo-4-[(4-sulfophenyl)azo]-1-naphthalenyl]azo], tetrasodium salt (7Cl); 1,3-Benzenedicarboxylic acid, 5-[[4-[(7-amino-1-hydroxy-3-sulfo-2-naphthalenyl)

azo]-6-sulfo-1-naphthalenyl]azo]-, tetraammonium salt (9Cl); a black dye of formula 1:

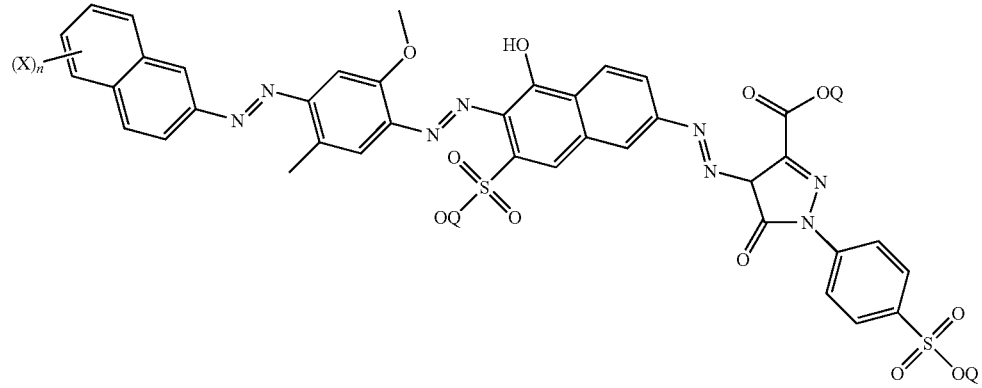

Formula (1)

wherein X is SO$_3$O, where O is a sodium ion, lithium ion, or a combination thereof, and where n is 1, 2 or 3; a black dye of formula 2:

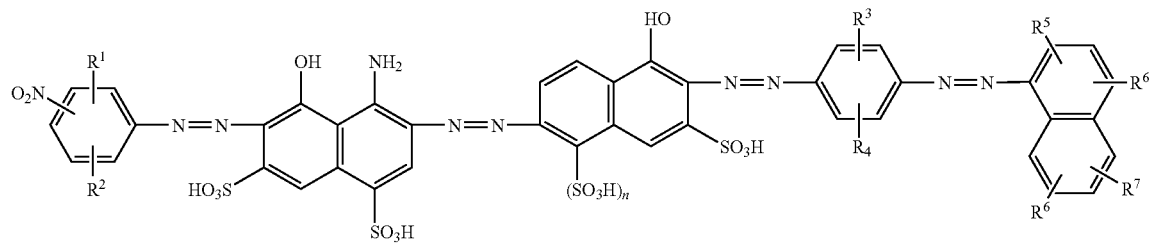

Formula (2)

wherein R$^1$ and R$^2$ each independently represents a hydrogen, a halogen, a cyano group, a carboxy group, a sulfo group, a sulfamoyl group, a N-alkylaminosulfonyl group, and a N-phenylaminosulfonyl group; R$^3$, R$^4$, R$^5$, R$^6$, R$^7$, and R$^8$ each independently represents a hydrogen, a halogen group, a hydroxy group, a cyano group, a carboxy group, a sulfo group, a sulfamoyl group, a N-alkylaminosulfonyl group, a N-phenylaminosulfonyl group; and n is 0 or 1; and combinations thereof; and forming the dye-based ink formulation.

12. The method of claim 11, wherein the solvent is selected from the group consisting of 1,2,4-butanetriol; 1,3-butylene glycol; N-(2-hydroxyethyl)propanamide; 1,2-butylenegly-col; 2,3-butanediol; 3-methyl-1,5-pentanediol; 1,6-hexanediol; 2-methyl-2,4-pentandiol; urea; betaine 5 sulfolane; 1,2-hydroxyethyl-2-pyrrolidinone; sulfolane, and combinations thereof.

13. The method of claim 12, wherein the solvent is in an amount from about 10 to 25 weight percent of the dye-based ink formulation.

14. The method of claim 11, wherein the black dye includes compounds defined by formula 1 below:

Formula (1)

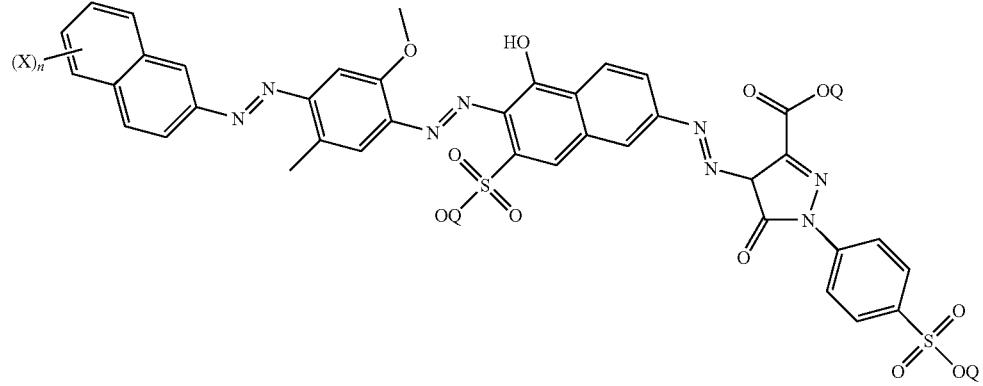

wherein X is SO₃Q, where Q is a sodium ion, lithium ion, or a combination thereof, and where n is 1, 2 or 3.

15. The method of claim 11, wherein the black dye includes compounds defined by formula 2 below:

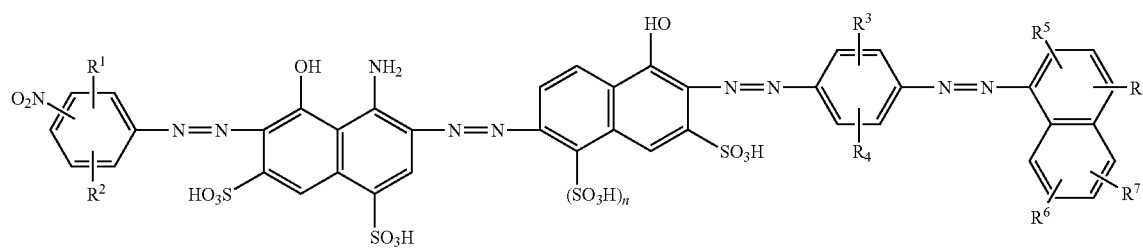

Formula (2)

wherein R¹ and R² each independently represents a hydrogen, a halogen, a cyano group, a carboxy group, a sulfo group, a sulfamoyl group, a N-alkylaminosulfonyl group, and a N-phenylaminosulfonyl group; R³, R⁴, R⁵, R⁶, R⁷, and R⁸ each independently represents a hydrogen, a halogen group, a hydroxy group, a cyano group, a carboxy group, a sulfo group, a sulfamoyl group, a N-alkylaminosulfonyl group, a N-phenylaminosulfonyl group; and n is 0 or 1.

16. The method of claim 11, wherein the yellow dye is selected from the group consisting of: 1,5-Naphthalenedisulfonic acid, 3-[[4-[[4,6-bis[(3-sulfopropyl)thio]-1,3,5-triazin-2-yl]amino]-5-methoxy-2-methylphenyl]azo]-, tetrasodium salt (9Cl); 1,3-Naphthalenedisulfonic acid, 7-[[4-[[4,6-bis[(3-sulfopropyl)thio]-1,3,5-triazin-2-yl]amino]-3-methoxyphenyl]azo]-, tetrasodium salt (9Cl); Benzenesulfonic acid, 2,5-dichloro-4-[4,5-dihydro-3-methyl-5-oxo-4-[(4-sulfophenyl)azo]-1H-pyrazol-1-yl]-, disodium salt (9Cl); 1H-Pyrazole-3-carboxylic acid, 4,5-dihydro-5-oxo-1-(4-sulfophenyl)-4-[(4-sulfophenyl)azo], trisodium salt (9Cl); 1,5-Naphthalenedisulfonic acid, 3,3'-[[6-[(2-hydroxyethyl)amino]-1,3,5-triazine-2,4-diyl]bis[imino(2-methyl-4,1-phenylene)-2,1-diazenediyl]]bis-, sodium salt (1:4) or TMA salt; and combinations.

17. The method of claim 11, wherein the magenta dye is selected from the group consisting of: 6-Benzothiazolesulfonic acid, 2-[4-cyano-3-(1,1-dimethylethyl)-5-[[4-methyl-6-[(6-sulfo-2 benzothiazolyl)(2,4,6-trimethyl-3-sulfophenyl)amino]-2-[(2,4,6-trimethyl-3-sulfophenyl)amino]-3-pyridinyl]azo]-1H-pyrazol-1-yl]; 1,3-Benzenedisulfonic acid, 4-[[2,7-dihydro-3-methyl-2,7-dioxo-1-(3-sulfobenzoyl)-3H-naphtho[1,2,3-de]quinolin-6-yl]amino]-, ammonium salt (1:3); 2,7-Naphthalenedisulfonic acid, 5-(benzoylamino)-4-hydroxy-3-[[1-sulfo-6-[[2-(sulfooxy)ethyl]sulfonyl]-2-naphthalenyl]azo], tetrasodium salt (9Cl); Xanthylium, 3-[(2,6-dimethylphenyl)amino]-6-[(2,6-dimethylsulfophenyl)amino]-9-(2-sulfophenyl)-, inner salt, monosodium salt (9Cl; Xanthylium, 3,6-bis(diethylamino)-9-(2,4-disulfophenyl)-, inner salt, sodium salt (9Cl; 2-Naphthalenesulfonic acid, 6-amino-5-[[4-[[4-[bis(2-hydroxyethyl)amino]-6-[(2-sulfoethyl)amino]-1,3,5-triazin-2-yl]amino]phenyl]azo]-4-hydroxy-, disodium salt (9Cl; Nickel, 5-[(2-hydroxy-3,7-disulfo-1-naphthalenyl)azo]-1H-1,2,4-triazole-3-carboxylate sodium complexes; and combinations thereof.

18. The method of claim 11, wherein the cyan dye is selected from the group consisting of Cuprate(3-), [[3,3',3''-[[23-[[3-[[(2-hydroxypropyl)amino]sulfonyl]propyl]sulfonyl]-29H,31H-phthalocyanine-2,9,16-triyl-κN29,κN30, κN31,κN32]tris(sulfonyl)]tris[1-propanesulfonato]](5-)]-, trilithium, (SP-4-2)-(9Cl); Copper, [29H,31H-phthalocyaninato (2-)-kN29,kN30,kN31,kN32]-, aminosulfonyl [(2-hydroxyethyl)amino]sulfonyl sulfo derivatives; ammonium sodium salts; Copper, [29H,31H-phthalocyaninato(2-)-xN29,xN30,xN31,xN32]-,aminosulfonyl[(2-hydroxyethyl)amino]sulfonyl sulfo derivatives, sodium salts; and combinations thereof.

19. The method of claim 11, wherein:
the yellow dye is selected from the group consisting of 1,5-Naphthalenedisulfonic acid, 3-[[4-[[4,6-bis[(3-sulfopropyl)thio]-1,3,5-triazin-2-yl]amino]-5-methoxy-2-methylphenyl]azo]-, tetrasodium salt (9Cl); 1,3-Naphthalenedisulfonic acid, 7-[[4-[[4,6-bis[(3-sulfopropyl)thio]-1,3,5-triazin-2-yl]amino]-3-methoxyphenyl]azo]-, tetrasodium salt (9Cl); Benzenesulfonic acid, 2,5-dichloro-4-[4,5-dihydro-3-methyl-5-oxo-4-[(4-sulfophenyl)azo]-1H-pyrazol-1-yl]-, disodium salt (9Cl); 1H-Pyrazole-3-carboxylic acid, 4,5-dihydro-5-oxo-1-(4-sulfophenyl)-4-[(4-sulfophenyl)azo], trisodium salt (9Cl); 1,5-Naphthalenedisulfonic acid, 3,3'-[[6-[(2-hydroxyethyl)amino]1,3,5-triazine-2,4-diyl]bis[imino(2-methyl-4,1-phenylene)-2,1-diazenediyl]]bis-, sodium salt (1:4) or TMA salt; and combinations thereof;

the magenta dye is selected from the group consisting of 6-Benzothiazolesulfonic acid, 2-[4-cyano-3-(1,1-dimethylethyl)-5-[[4-methyl-6-[(6-sulfo-2 benzothiazolyl)(2,4,6-trimethyl-3-sulfophenyl)amino]-2-[(2,4,6-trimethyl-3-sulfophenyl)amino]-3-pyridinyl]azo]-1H-pyrazol-1-yl]; 1,3-Benzenedisulfonic acid, 4-[[2,7-dihydro-3-methyl-2,7-dioxo-1-(3-sulfobenzoyl)-3H-naphtho[1,2,3-de]quinolin-6-yl]amino]-, ammonium salt (1:3); 2,7-Naphthalenedisulfonic acid, 5-(benzoylamino)-4-hydroxy-3-[[1-sulfo-6-[[2-(sulfooxy)ethyl]sulfonyl]-2-naphthalenyl]azo]-, tetrasodium salt (9Cl); Xanthylium, 3-[(2,6-dimethylphenyl)amino]-6-[(2,6-dimethylsulfophenyl)amino]-9-(2-sulfophenyl)-, inner salt, monosodium salt (9Cl); Xanthylium, 3,6-bis(diethylamino)-9-(2,4-disulfophenyl)-, inner salt, sodium salt (9Cl); 2-Naphthalenesulfonic acid, 6-amino-5-[[4-[[4-[bis(2-hydroxyethyl)amino]-6-[(2-sulfoethyl)amino]-1,3,-5-triazin-2-yl]amino]phenyl]azo]-4-hydroxy-, disodium salt (9Cl); Nickel, 5-[(2-hydroxy-3,7-disulfo-1-naphthalenyl)azo]-1H-1,2,4-triazole-3-carboxylate sodium complexes; and combinations thereof; and the cyan dye is selected from the group consisting of Cuprate(3-), [[3,3',3''-[[23-[[3-[[(2-hydroxypropyl)

amino]sulfonyl]propyl]sulfonyl]-29H,31H-phthalo-cyanine-2,9,16-triyl-κN29,κN30,κN31,κN32]tris(sulfonyl)]tris[1-propanesulfonato]](5-)]-, trilithium, (SP-4-2)-(9Cl); Copper, [29H,31H-phthalocyaninato (2-)-kN29,kN30,kN31,kN32]-, aminosulfonyl [(2-hydroxyethyl)amino]sulfonyl sulfo derivatives, ammonium sodium salts; Copper, [29H,31H-phthalo-cyaninato(2-)-xN29,xN30,xN31,xN32]-,aminosulfonyl[(2-hydroxyethyl)amino]sulfonyl sulfo derivatives, sodium salts; and combinations thereof.

20. The dye-based ink formulation of claim 1, wherein the ink has improved ozone fastness when tested using an ozone chamber at a temperature of 25°, 50% relative humidity, and with an ozone concentration of 1 ppm.

21. The dye-based ink-formulation of claim 1, wherein the ink has improved light fastness when tested using light exposure of 450 lux/per 12 hour day.

22. The dye-based ink-formulation of claim 1, wherein the ink has improved water fastness when tested using the ISO water resistance testing method.

* * * * *

UNITED STATES PATENT AND TRADEMARK OFFICE
CERTIFICATE OF CORRECTION

| | | |
|---|---|---|
| PATENT NO. | : 7,828,887 B2 | |
| APPLICATION NO. | : 11/788904 | |
| DATED | : November 9, 2010 | |
| INVENTOR(S) | : Sukanya Rengaswamy et al. | |

It is certified that error appears in the above-identified patent and that said Letters Patent is hereby corrected as shown below:

In column 12, line 30, in Claim 1, delete "4-pentandiol" and insert -- 4-pentanediol --, therefor.

In column 12, line 33, in Claim 1, delete "N-actyl" and insert -- N-acetyl --, therefor.

In column 12, line 38, in Claim 1, delete "of" and insert -- of: --, therefor.

In column 14, line 2, in Claim 1, delete "halogen a" and insert -- a halogen, a --, therefor.

In column 14, line 17, in Claim 2, delete "4-pentandiol" and insert -- 4-pentanediol --, therefor.

In column 14, line 30, in Claim 4, delete "a a" and insert -- a --, therefor.

In column 15, line 17, in Claim 7, delete "1-yl]," and insert -- 1-yl]-, --, therefor.

In column 15, line 27, in Claim 8, delete "2 benzothiazolyl)" and insert -- 2-benzothiazolyl --, therefor.

In column 15, line 37, in Claim 8, delete "(9Cl;" and insert -- (9Cl); --, therefor.

In column 15, line 38, in Claim 8, delete "(9Cl;" and insert -- (9Cl); --, therefor.

In column 15, line 40, in Claim 8, delete "(9Cl;" and insert -- (9Cl); --, therefor.

In column 15, line 45, in Claim 9, delete "of" and insert -- of: --, therefor.

In column 16, line 5, in Claim 10, delete "2 benzothiazolyl" and insert -- 2-benzothiazolyl --, therefor.

In column 16, line 19, in Claim 10, delete "3,-5-" and insert -- 3,5 --, therefor.

In column 16, lines 32-33, in Claim 10, delete "N32]-,aminosulfonyl" and insert

Signed and Sealed this
Fifteenth Day of November, 2011

David J. Kappos
*Director of the United States Patent and Trademark Office*

CERTIFICATE OF CORRECTION (continued)
U.S. Pat. No. 7,828,887 B2

-- N32]-, aminosulfonyl --, therefor.

In column 16, line 40, in Claim 11, delete "of" and insert -- of: --, therefor.

In column 16, line 42, in Claim 11, delete "3-methyl," and insert -- 3-methyl-, --, therefor.

In column 16, line 43, in Claim 11, delete "4-pentandiol" and insert -- 4-pentanediol --, therefor.

In column 16, line 47, in Claim 11, delete "N-actyl" and insert -- N-acetyl --, therefor.

In column 16, line 52, in Claim 11, delete "of" and insert -- of: --, therefor.

In column 17, line 20, in Claim 11, delete "$SO_3O$," and insert -- $SO_3Q$, --, therefor.

In column 17, line 20, in Claim 11, delete "O" and insert -- Q --, therefor.

In column 18, line 42, in Claim 12, delete "of" and insert -- of: --, therefor.

In column 18, line 45, in Claim 12, delete "4-pentandiol" and insert -- 4-pentanediol --, therefor.

In column 19, line 48, in Claim 17, delete "2 benzothiazolyl" and insert -- 2-benzothiazolyl --, therefor.

In column 19, line 58, in Claim 17, delete "(9Cl;" and insert -- (9Cl); --, therefor.

In column 19, line 59, in Claim 17, delete "(9Cl;" and insert -- (9Cl); --, therefor.

In column 19, line 62, in Claim 17, delete "(9Cl;" and insert -- (9Cl); --, therefor.

In column 19, line 67, in Claim 18, delete "of" and insert -- of: --, therefor.

In column 20, line 21, in Claim 18, delete "derivatives;" and insert -- derivatives, --, therefor.

In column 20, line 23, in Claim 18, delete "N32]-,aminosulfonyl" and insert
-- N32]-, aminosulfonyl --, therefor.

In column 20, line 46, in Claim 19, delete "2 benzothiazolyl" and insert -- 2-benzothiazolyl --, therefor.

In column 20, line 61, in Claim 19, delete "3,-5" and insert -- 3,5 --, therefor.

In column 20, line 66, in Claim 19, delete "of" and insert -- of: --, therefor.

In column 21, lines 8-9, in Claim 19, delete "N32]-,aminosulfonyl" and insert

-- N32]-, aminosulfonyl --, therefor.

In column 22, line 1, in Claim 20, delete "25°," and insert -- 25°C., --, therefor.

In column 22, line 5, in Claim 21, delete "lux/per" and insert -- lux per --, therefor.